United States Patent
Ellis et al.

(10) Patent No.: US 9,630,822 B2
(45) Date of Patent: Apr. 25, 2017

(54) METHOD OF WEIGHING A LOAD LIFTED BY A LIFTING ARM OF A MACHINE

(71) Applicant: J. C. Bamford Excavators Limited, Rocester, Uttoxeter, Staffordshire (GB)

(72) Inventors: Luke Francis Ellis, Uttoxeter (GB); Luciano Argentieri, Uttoxeter (GB); Richard Brooks, Uttoxeter (GB)

(73) Assignee: J. C. Bamford Excavators Limited, Uttoxeter, Staffordshire (GB)

(*) Notice: Subject to any disclaimer, the term of this patent is extended or adjusted under 35 U.S.C. 154(b) by 51 days.

(21) Appl. No.: 14/333,272

(22) Filed: Jul. 16, 2014

(65) Prior Publication Data
US 2015/0027789 A1    Jan. 29, 2015

(30) Foreign Application Priority Data

Jul. 26, 2013 (GB) .................................. 1313376.4

(51) Int. Cl.
*G01G 19/08* (2006.01)
*B66F 17/00* (2006.01)
*B66F 9/065* (2006.01)

(52) U.S. Cl.
CPC ............ *B66F 17/003* (2013.01); *B66F 9/065* (2013.01); *G01G 19/083* (2013.01)

(58) Field of Classification Search
CPC ...... G01G 19/08; G01G 19/083; G01G 19/10; G01G 19/12; G01G 19/14; G01G 19/16; G01G 19/18; G01G 19/20; B66F 17/003; B66F 9/065
See application file for complete search history.

(56) References Cited

U.S. PATENT DOCUMENTS

| | | | |
|---|---|---|---|
| 4,516,116 A * | 5/1985 | White | B66C 23/905 340/665 |
| 5,161,628 A | 11/1992 | Wirth | |
| 5,167,287 A * | 12/1992 | Pomies | G01G 19/10 177/1 |
| 5,388,857 A * | 2/1995 | Wernimont | B60G 17/005 212/301 |

(Continued)

FOREIGN PATENT DOCUMENTS

CN    201817826 U    5/2011
DE    199-19-655 A1    11/2000

(Continued)

OTHER PUBLICATIONS

Machine translation of DE 10 2011 108 874 downloaded Jan. 20, 2016.*

(Continued)

*Primary Examiner* — Natalie Huls
(74) *Attorney, Agent, or Firm* — Marshall, Gerstein & Borun LLP (57) ABSTRACT

A method of weighing a load lifted by a lifting arm of a machine is disclosed and includes receiving a signal from an axle sensor, said signal representing a force exerted on an axle as a result of lifting the load, receiving a further signal from a further sensor, said further signal representing an angle or slope of the lifting arm relative to a chassis of the machine, and calculating, from the received signal and the received further signal, the weight of the load lifted by the lifting arm.

12 Claims, 10 Drawing Sheets

(56) References Cited

U.S. PATENT DOCUMENTS

| | | | | |
|---|---|---|---|---|
| 5,711,440 A * | 1/1998 | Wada | ................... | B66C 23/905 |
| | | | | 212/231 |
| 6,202,013 B1 * | 3/2001 | Anderson | ............... | B66C 13/40 |
| | | | | 212/276 |
| 6,385,518 B1 * | 5/2002 | Rickers | ................... | B66F 17/00 |
| | | | | 340/440 |
| RE39,477 E * | 1/2007 | Nellers | ................... | B60G 9/02 |
| | | | | 280/124.112 |
| 7,216,024 B1 * | 5/2007 | Abels | ..................... | B60T 8/241 |
| | | | | 340/685 |
| 2003/0060923 A1 * | 3/2003 | Scotese | ................... | B60G 9/02 |
| | | | | 700/217 |
| 2004/0200644 A1 * | 10/2004 | Paine | .................. | G01G 19/083 |
| | | | | 177/136 |

FOREIGN PATENT DOCUMENTS

| | | |
|---|---|---|
| DE | 100-10-011 A1 | 2/2001 |
| DE | 102011108874 A1 | 1/2013 |
| EP | 0 496 166 A2 | 7/1992 |
| EP | 2 520 536 A1 | 11/2012 |
| EP | 2-607-295 A1 | 6/2013 |
| GB | 2 324 871 A | 11/1998 |
| GB | 2 487 608 A | 8/2012 |

OTHER PUBLICATIONS

Search Report for EP 14177506, dated Oct. 17, 2014.
Search Report for GB 1313376.4, dated Sep. 20, 2013.

\* cited by examiner

METHOD OF WEIGHING A LOAD LIFTED BY A LIFTING ARM OF A MACHINE

FIELD OF THE INVENTION

The above invention relates to a method of weighing a load lifted by a lifting arm of a machine.

BACKGROUND OF THE INVENTION

Known working machines, such as telescopic handlers have a boom, or arm that is able to lift loads. The boom is raised and lowered relative to a chassis of the telescopic handler by a hydraulically actuated lift ram. By knowing various dimensions of the machine, including the angle of the arm relative to the chassis of the machine it is possible to monitor the change of hydraulic pressure in the lift ram to calculate an estimate of the weight of the load lifted. However, calculating the load from hydraulic pressure is not very accurate because of fluctuations in pressure under different conditions, for example, crowding/dumping of the load, changing the lift speed of the arm, changing the extension on the arm, changing the angle of the arm relative to the chassis.

In order to improve the accuracy of weighing the operation of the machine may be restricted. For example weighing may only take place under certain conditions. In one example weighing can only be done at a predefined arm angle. In another example, it is necessary to raise the arm at a predetermined speed as well as ensuring that the engine speed is kept at a predetermined rpm. Such prior art weighing systems limit the operation of the machine and therefore the machine takes longer to carry out specific tasks, for example loading grain or the like into a lorry. Furthermore, such prior art weighing systems require a high level of skill from the operator in order to achieve more accurate results.

SUMMARY

Accordingly there is a requirement for an improved method of weighing a load lifted by a lifting arm of a machine.

BRIEF DESCRIPTION OF THE DRAWINGS

The invention will now be described, by way of example only, with reference to the accompanying drawings in which.

DETAILED DESCRIPTION OF THE INVENTION

Figure 1:
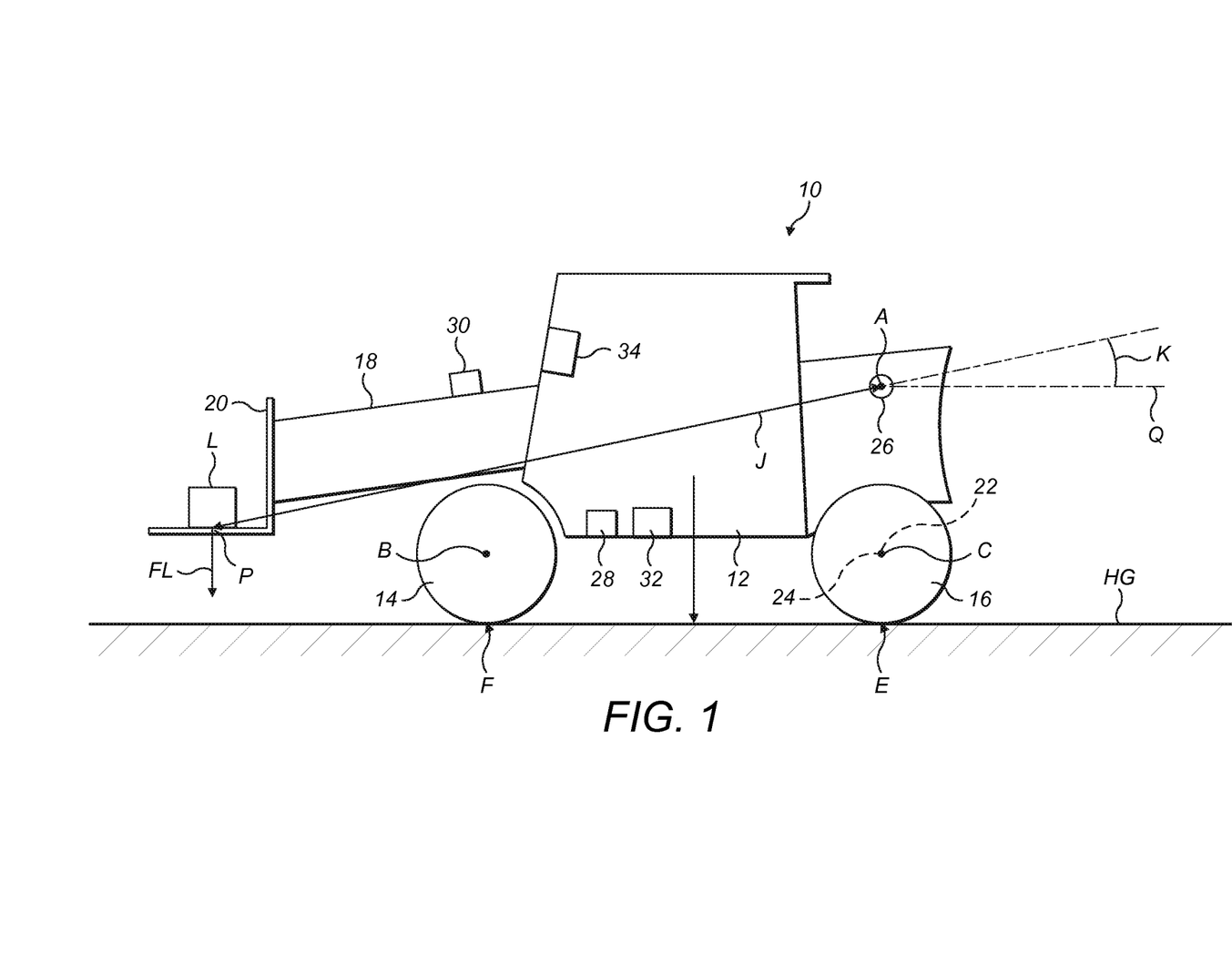
FIG. 1 is a schematic side view of a machine according to the present invention capable of carrying out a method according to the present invention including a load.

With reference to FIG. 1 there is shown a working machine 10, in this case a telehandler. The machine includes a chassis 12 and ground-engaging means in the form of two front wheels 14 (only one shown) and two rear wheels 16 (only one shown). The machine includes a boom, or arm 18 at the front of which is mounted an attachment 20. The arm 18 is pivotable about a generally horizontal pivot axis A which is orientated transversely relative to the machine. The front wheels 14 rotate about axis B and the rear wheels rotate about axis C. As shown in FIG. 1 the machine is standing on horizontal ground HG with the front wheels 14 contacting the ground at F and with the rear wheels contacting the horizontal ground at E. A load L is then carried by the attachment 20. Load L creates a force $F_L$ as shown in FIG. 1. The arm 18 has an effective length J defined as the distance between the horizontal pivot axis A and the point of application P of the load L on the attachment 20. The arm 18 also has an effective arm angle K defined as the angle between the arm and a datum plane Q of the chassis 12. The datum plane Q of the chassis is always parallel to ground on which the machine is standing (even if the ground is not horizontal).

The two rear wheels 16 are mounted on a rear axle 22. The rear axle 22 is pivotable about a generally horizontal axis orientated in the longitudinal direction of the working machine. The rear axle 22 includes a rear axle sensor 24.

An angle sensor 26 is mounted on the machine 10.

The machine 10 also includes a chassis sensor 28 and an arm extension sensor 30. The machine also includes an electronic control unit (ECU) 32 (or controller) and a display unit 34.

The rear axle sensor 24 is used to measure the weight applied to the rear axle. In particular rear axle sensor 24 can generate a signal which represents a force applied by the chassis of the machine to the rear axle. The angle sensor 26 can be used to measure the effective arm angle, and in particular generate a signal representing an angle or slope of the lifting arm relative to the chassis of the machine. The chassis sensor 28 is used to measure the angle of the chassis relative to the horizontal. The chassis sensor may generate a signal representing an angle of the chassis relative to the horizontal. As shown in FIG. 1 because the machine is mounted on horizontal ground HG, then the datum plane Q is parallel to the horizontal. However in different circumstances, the vehicle may be on a slope, and whilst the datum plane Q may be parallel to the slope, the datum plane Q will not be parallel to the horizontal.

The arm 18 is an extendable arm and the arm sensor 30 is used to determine whether or not the arm is extended. The arm extension sensor 30 may also be used to determine the amount of extension of the arm. It is therefore possible to use the extension sensor 30 to determine the instantaneous length J of the arm.

Figure 2:
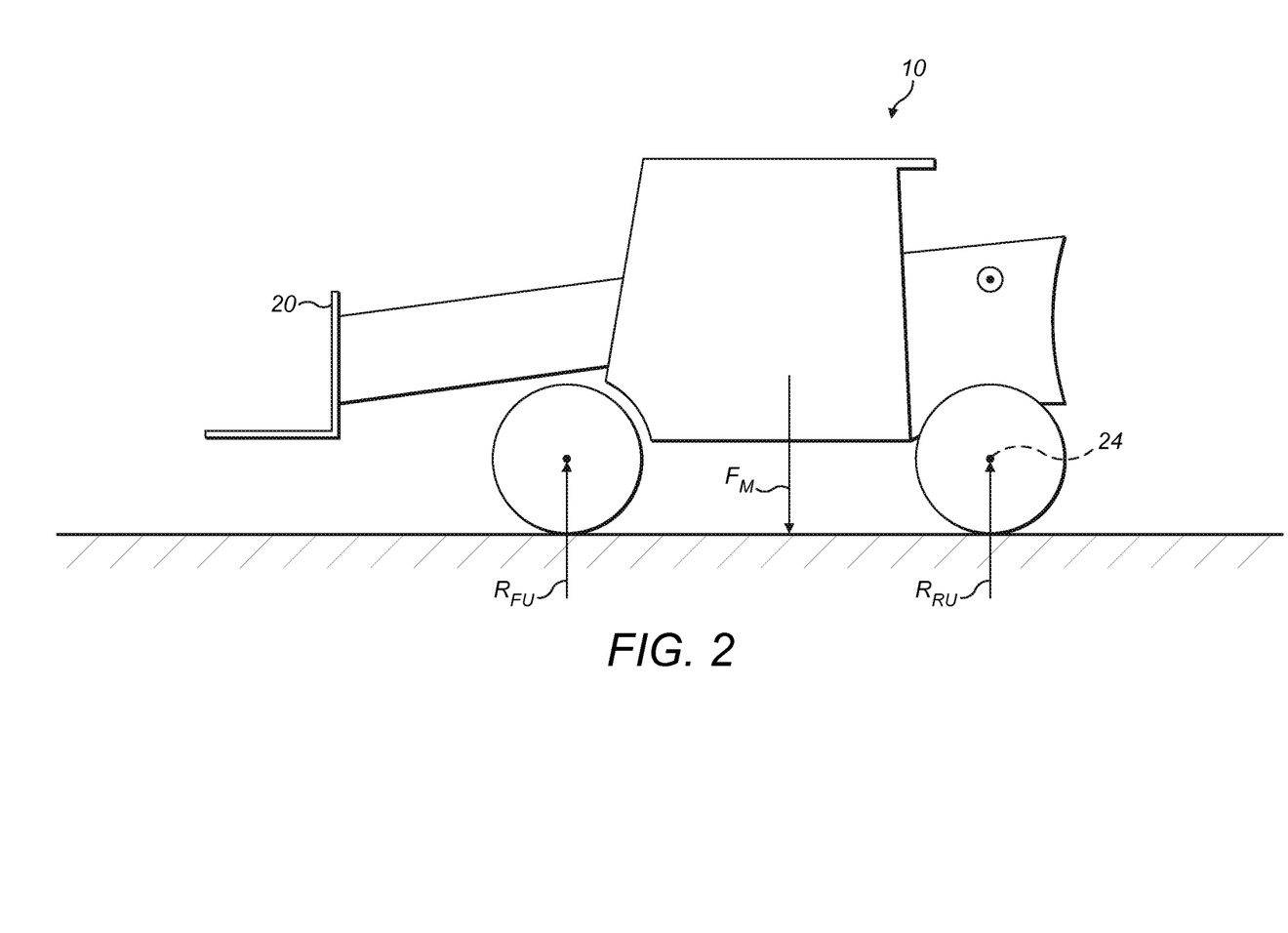
FIG. 2 shows the machine of FIG. 1 without the load.

As shown in FIG. 2, the machine is carrying the attachment 20. There is no load on the attachment. The mass of the machine acts downwardly creating a force Fm. This is reacted at the front axle by a force $R_{fu}$ and at the rear axle by a force $R_{ru}$. The rear axle sensor 24 generates a signal representing a force exerted on the rear axle, i.e. it generates a signal representative of $R_{ru}$.

Figure 3:
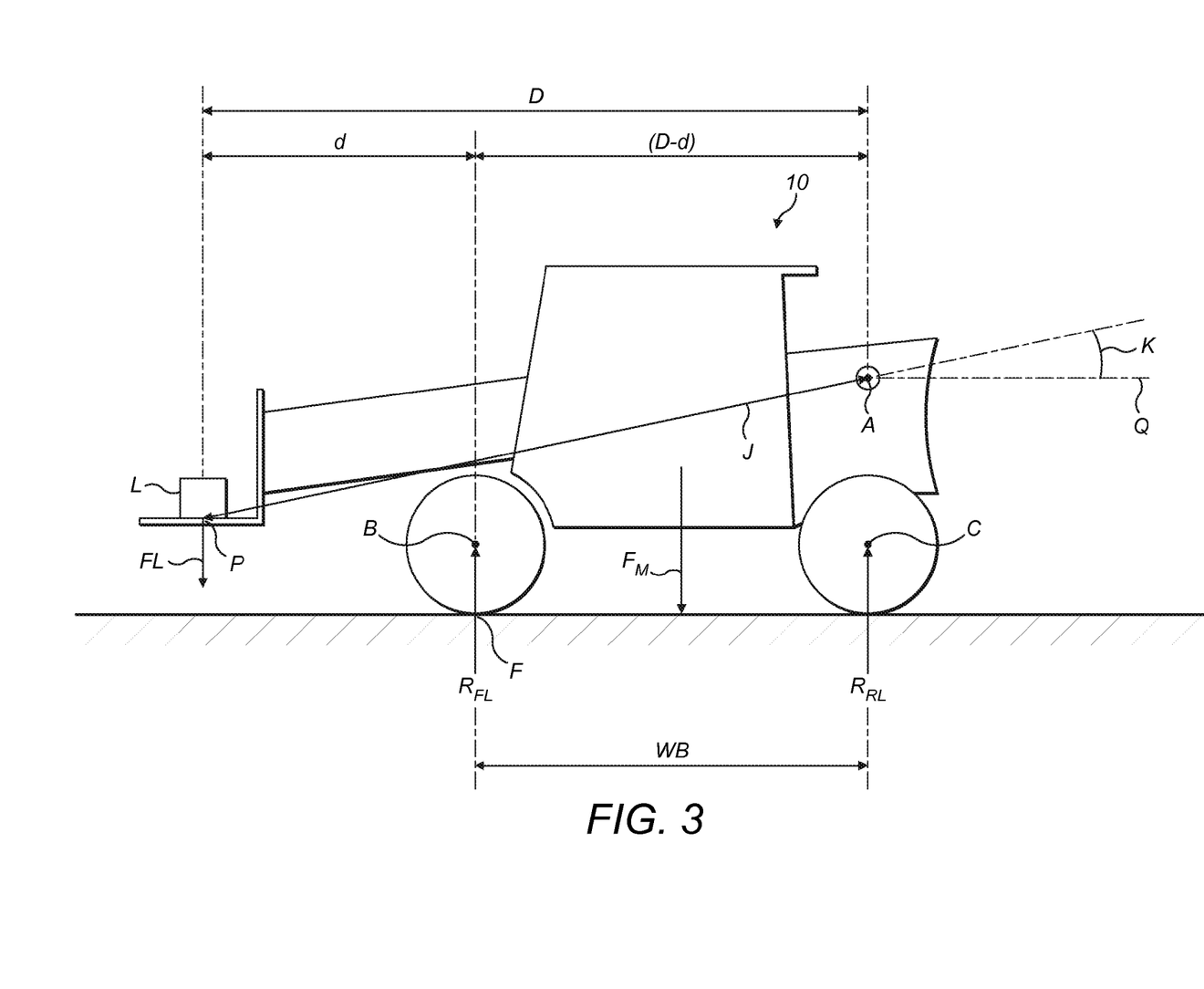
FIG. 3 is a repeat view of FIG. 1.

As shown in FIG. 3, load L has been applied to the attachment 20. A comparison between FIGS. 2 and 3 shows that the arm angle is the same position and the arm extension is the same (in both cases the arm is in its fully retracted position). As will be appreciated, because the load has been applied at the front of the arm, in front of the front wheels, then a tipping moment has been created about point F and as such the load on the rear axle will have reduced. By knowing certain information about the machine 10 and by knowing the reduction in the load on the rear axle, it is possible to calculate the weight $F_L$ of the load L.

Thus, D equals the effective length of the arm taken in a horizontal plane of the chassis. Because the arm is at an angle K relative to the datum plane of the chassis then $D = J \cos K$.

The wheel base of the machine is WB. In this example the horizontal pivot axis A is vertically above axis C.

d is the distance in a horizontal plane of the chassis between the axis B and the point of application of the load. The distance between the front axis B and the horizontal pivot axis A in the horizontal plane of the chassis therefore equals (D-d), which in this case also equals WB.

Rrl is the load applied to the rear axle when the machine has lifted load L.

As will be appreciated the moment that the load L applies about axis B will be reflected in a reduction in the load applied to the rear axle. Thus:

$$F_L \times d = (D-d) \times (Rru - Rrl) \quad \text{(Equation 1)}$$

Rru can be determined from the signal generated by sensor 24 prior to the load being applied to the attachment.

$R_{rl}$ can be determined from the signal from the sensor 24 after the load L has been applied to the attachment.

Since $D = J \cos K$ and since J can be determined from the signal generated by the arm extension sensor 30 and K can be determined from a signal generated by chassis sensor 28 then D can be determined.

The wheel base WB is a constant for the machine and hence d can be determined since $d = D - WB$. Accordingly equation 1 can be solved for $F_L$ and the load can therefore be determined.

Figure 4:
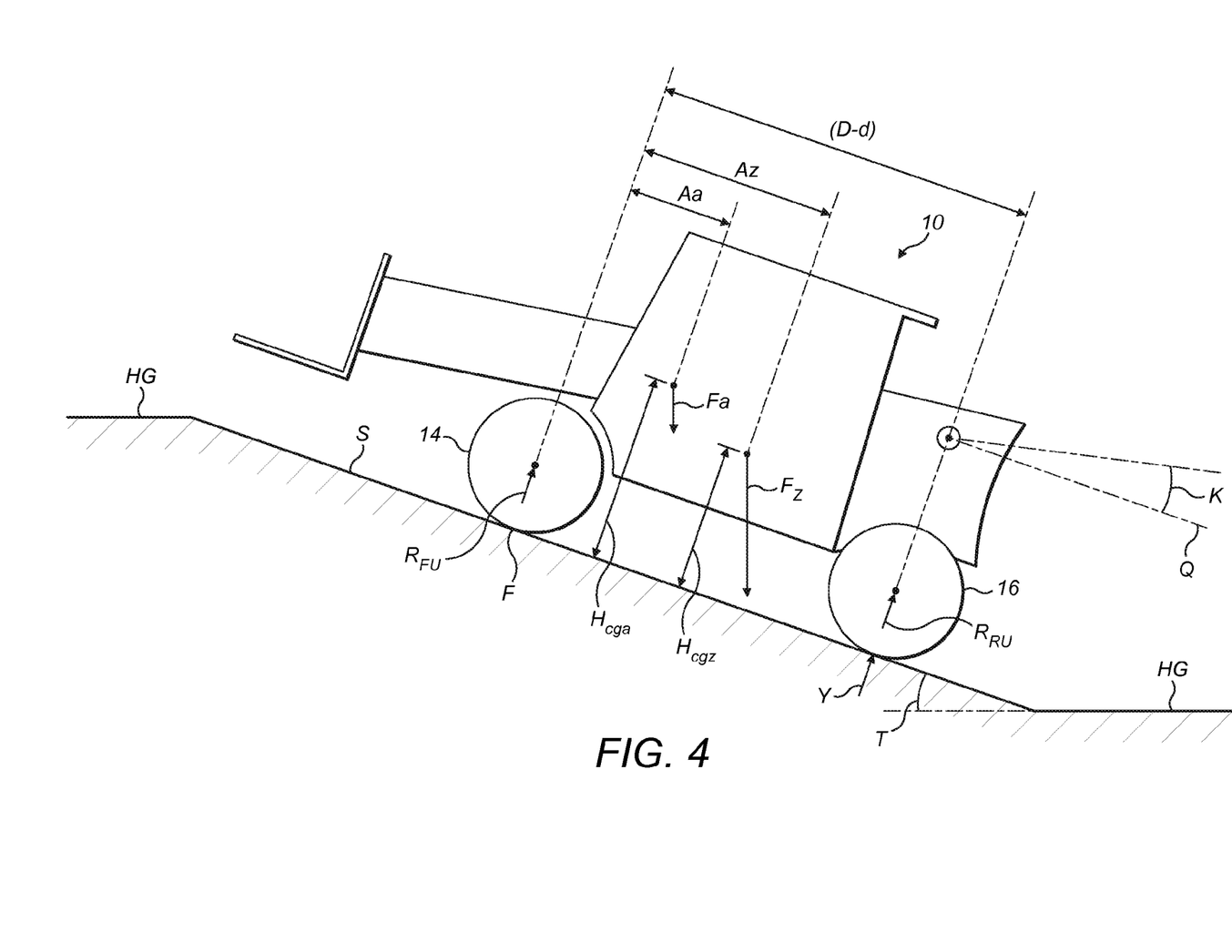
FIG. 4 shows the machine of FIG. 1 on a slope.

FIG. 4 shows the machine 10 on a slope S angled at angle T relative to the horizontal ground HG. In FIG. 4 there is no load on the attachment. The mass of the machine acts downwardly to create a force (not shown). As will be appreciated, this force is perpendicular to the horizontal ground HG but not perpendicular to the slope S. This causes a reaction force at the front axle of $R_{fu}$ and at the rear axle of $R_{ru}$. These reaction forces are perpendicular to the slope S and hence not parallel to the force created by the mass of machine, and therefore a friction force (not shown) is also generated parallel to the slope S where the wheels 14 and 16 touch the slope.

Figure 5:
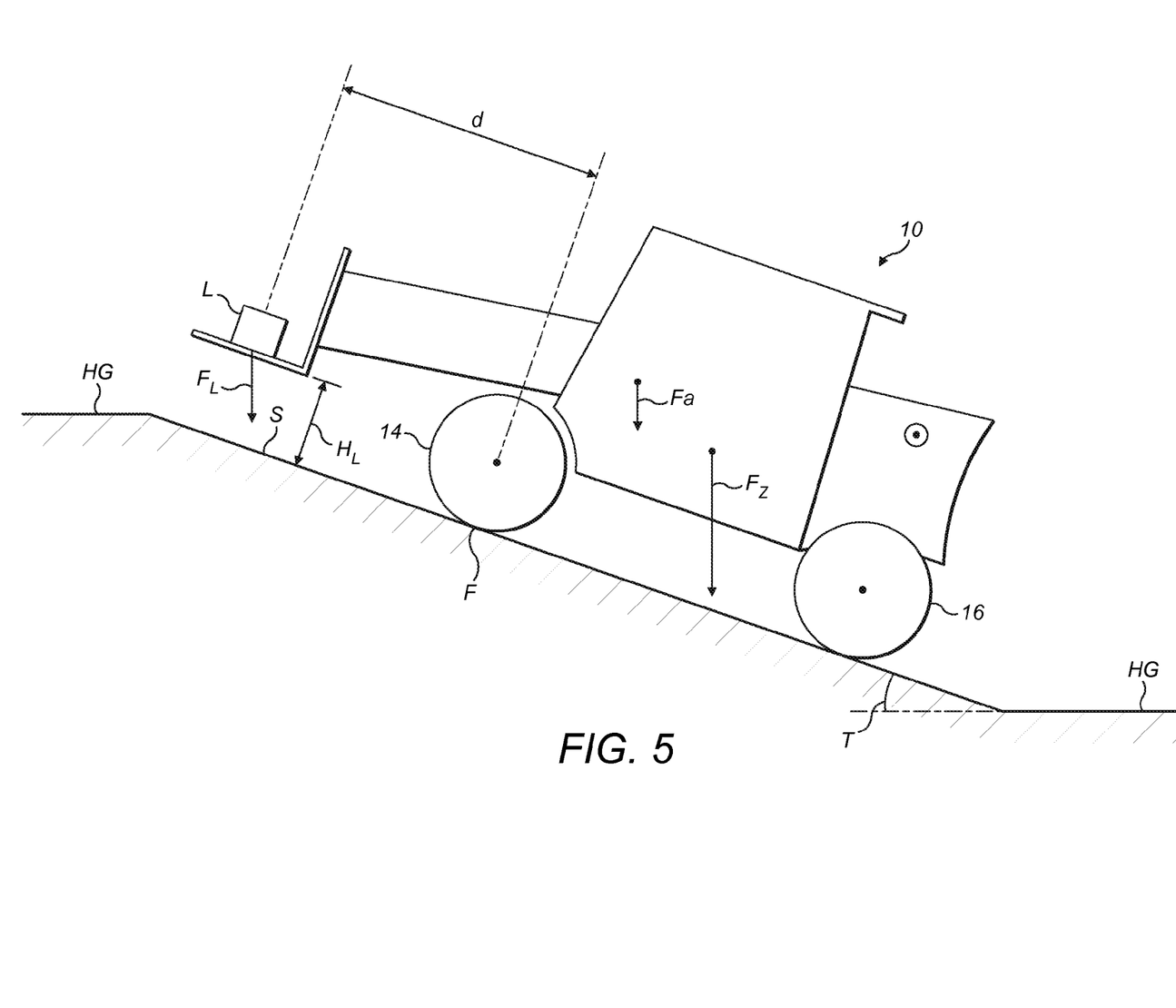
FIG. 5 shows the machine of FIG. 1 on a slope carrying a load.

FIG. 5 shows the machine in the same orientation as shown in FIG. 4 except in this case load L has been applied to the attachment. As will be appreciated, the application of load L as shown in FIG. 5 to the attachment will cause a reduction in the load being applied to the rear axle when compared to FIG. 4.

However, the sensor 24 on the rear axle may only measure loads applied to the rear axle in a direction perpendicular to the datum plane Q of the chassis which is perpendicular to the ground on which the machine is standing, and, as shown in FIG. 5, perpendicular to the slope. As can be seen from FIG. 5 because the machine 10 is positioned on slope S the datum plane Q of the chassis is no longer parallel with the horizontal ground HG. Thus, the reduction in load seen in a direction perpendicular to the datum plane Q of the chassis when the load LI is applied as shown in FIG. 5 is less than the reduction in load as seen on the rear axle when the same load L is applied to the attachment as shown in FIG. 3 when the datum plane Q of the chassis is parallel to horizontal ground HG. By using chassis sensor 28 to determine the relative angle between a horizontal plane of the chassis and horizontal ground it is still possible to determine the weight $F_L$ of load, even when the machine is on a slope and even when the boom (arm) angle K changes.

For the purposes of explanation, it is convenient to consider the force Fm as being comprised of the force Fa, which is the force produced by the mass of the arm 18 alone and a force Fz which is the force produced by the mass of machine in the absence of the arm 18 (see FIG. 4).

Clearly, $F_a + F_z = F_m$

The position of the centre of gravity of the arm 18 is a known for any arm angle. Similarly the position of the centre of gravity of the machine in the absence of the boom is also known. Whilst the position of the centre of gravity of the machine may vary, for example depending upon the position of a fuel tank and how full that fuel tank might be, nevertheless, depending upon the design of machine, the errors associated with not taking into account whether or not a fuel tank is full may not be significant. However if significant, an amount, and a position of fuel is a known, and therefore can be taken in to account. However, for the purposes of the present explanation the position of the centre of gravity of the machine in the absence of the boom is assumed to be known. Similarly, the mass of the arm is assumed to be constant and is known.

$H_{cga}$ is the height of the centre of gravity of the arm 18 alone and this is known for any arm angle K.

$H_{cgz}$ is the height of the centre of gravity of the machine in the absence of the arm, and this is known.

T is the angle of the slope and this can be determined from chassis sensor 28.

$A_z$ is the distance from the front axle to the centre of gravity of the machine in the absence of the boom and this is known.

$A_a$ is the distance from the front axle to the centre of gravity of the boom alone and this can be determined for any particular boom angle K.

The reaction load Y applied to the rear wheels by the ground can be determined since the rear axle force $R_{ru}$ can be determined from the rear axle sensor and knowing this information and also the mass of the rear axle and rear wheels Y can be determined.

Taking moments about point F gives the following:—

$$F_z \cos TA_Z + F_a \cos TA_a + F_Z \sin TH_{cgz} + F_a \sin TH_{cga} - Y(D-d) = 0 \quad \text{(Equation 2)}$$

As will be appreciated, there are no unknowns in equation 2.

FIG. 5 shows the machine 10 on the same angle of the slope and with the same boom angle but with a load L which generates a force $F_L$ as shown. For ease of explanation the centre of gravity of the load L is assumed to be at height $H_L$. Taking moments about point F gives:—

$$F_L \cos Td - F_L \sin TH_L + F_z \cos TA_Z + F_a \cos TA_a + F_Z \sin TH_{cgz} + F_a \sin TH_{cga} - Y(D-d) = 0 \quad \text{(Equation 3)}$$

As will be appreciated, equations 2 and equation 3 differ only in as much as equation 3 includes 2 terms relating to $F_L$. As mentioned above, all terms in equation 2 are known and accordingly there is only one unknown in equation 3, which is $F_L$. Accordingly, equation 3 can be solved for $F_L$ and hence the load can be determined.

FIGS. 4 and 5 show the machine with the same boom angle and same boom extension, however if the boom angle in FIG. 5 was changed then knowing a new boom angle means that:— a new d figure can be determined,
a new $H_L$ figure can be determined,
a new $H_{cga}$ figure can be determined,
a new $A_a$ figure can be determined.

These new figures can be substituted into equation 3 and therefore load L can be determined for any boom angle.

As shown in FIGS. 4 and 5 the boom extension remains constant. However, if the boom were extended or contracted it is still possible to determine $F_L$. Thus, starting with the machine unloading in the FIG. 4 position, the machine can pick up a load and hold that load at a different boom extension and at a different boom angle and the weight of the load can still be determined because of the arm extension sensor 30. Thus:— a new d figure can be determined,
a new $H_L$ figure can be determined,
a new $H_{cga}$ figure can be determined,
a new $A_a$ figure can be determined.

These new figures can be substituted into equation 3 and therefore load L can be determined for any boom angle.

As will be appreciated, an unladen machine can be positioned on any slope, with any boom angle, and with any boom extension, and be unladen. That machine can then pick up any load on the same or different slope, with the same or different boom extension, with the same or different boom angle and that load can be determined.

Figure 6:
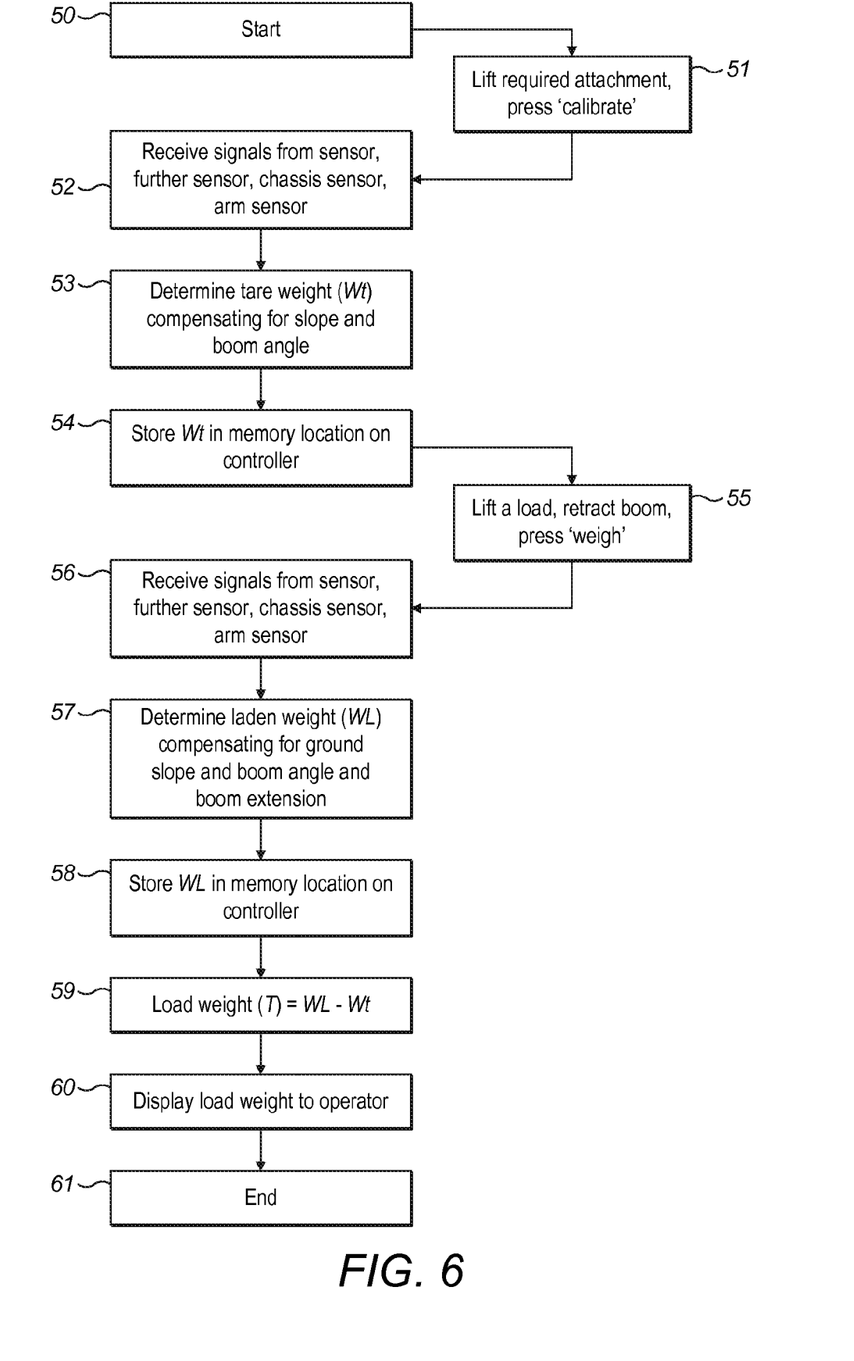
FIG. 6 shows the steps required to weigh a load according to the present invention.

FIG. 6 shows the method of weighing a load lifted by the arm 18 of the machine 10. The method starts at step 50. At step 51 the attachment is lifted away from the ground. The operator presses a "calibrate" button or the like on the display unit 34. At step 52 the processor receives a signal from rear axle sensor 24 which signal represents a force being exerted on the rear axle. The processor receives a signal from angle sensor 26 which signal represents an angle or slope of the lifting arm relative to a chassis of the machine. The processor receives a signal from chassis sensor 28 which signal represents an angle of the datum plane of the chassis relative to the horizontal. The processor receives a signal from the arm sensor 30 which signal represents an extension of the lifting arm.

At step 53 a "tare" weight (Wt) is determined. This tare weight is dependent upon the slope of the ground upon which the machine 10 is resting, the extension of the arm, the angle of the arm relative to the chassis and the angle of the chassis relative to the horizontal.

At step 54 this tare weight is stored in a memory location on the controller 32. At step 55 the machine is moved to lift a load. During manoeuvring to lift the load, the slope of the ground on which the machine is resting may change, the extension of the arm may change, the angle of the arm relative to the chassis may change. The change in these parameters of the machine can be compensated for at step 57. In other words, step 51 may be carried out with the machine orientated as shown in FIG. 2 and step 56 may be carried out wherein the machine is resting on a slope i.e. is not resting on horizontal ground, the boom extension is different to that shown in FIG. 2, the angle of the boom relative to the horizontal plane of the chassis may be different to that shown in FIG. 2 but nevertheless these differences may be compensated for in order to determine the weight of the load applied to the attachment. At step 58 the laden weight can be stored in a memory location on the controller 32 and at step 59 the weight of the load can be determined by subtracting the tare weight from the laden weight. At step 60 the load weight may be displayed to the operator on the display unit 34. The method of weighing the load ends at step 61.

Figure 7:
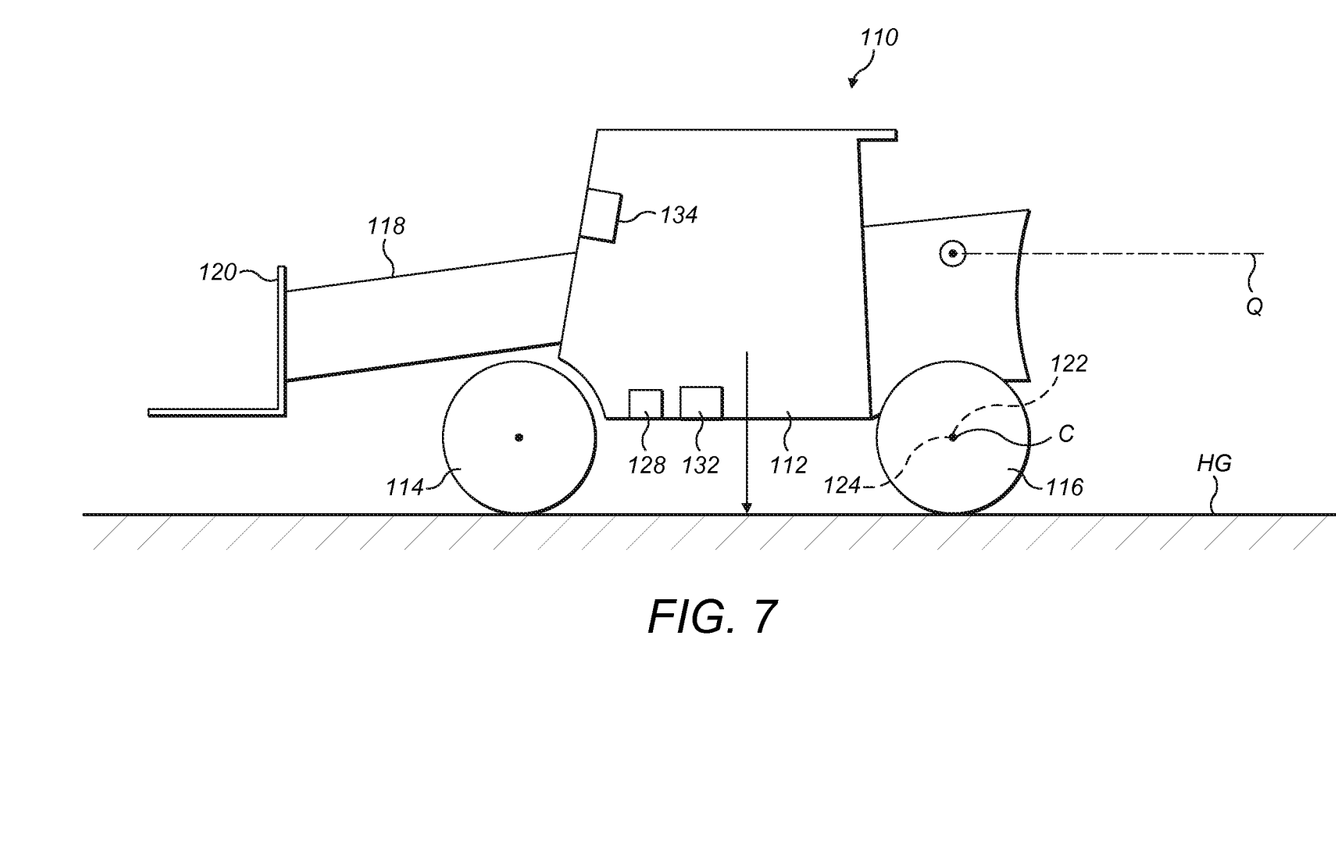
FIG. 7 shows a second embodiment of a machine according to the present invention capable of carrying out the method according to the present invention.
Figure 8:
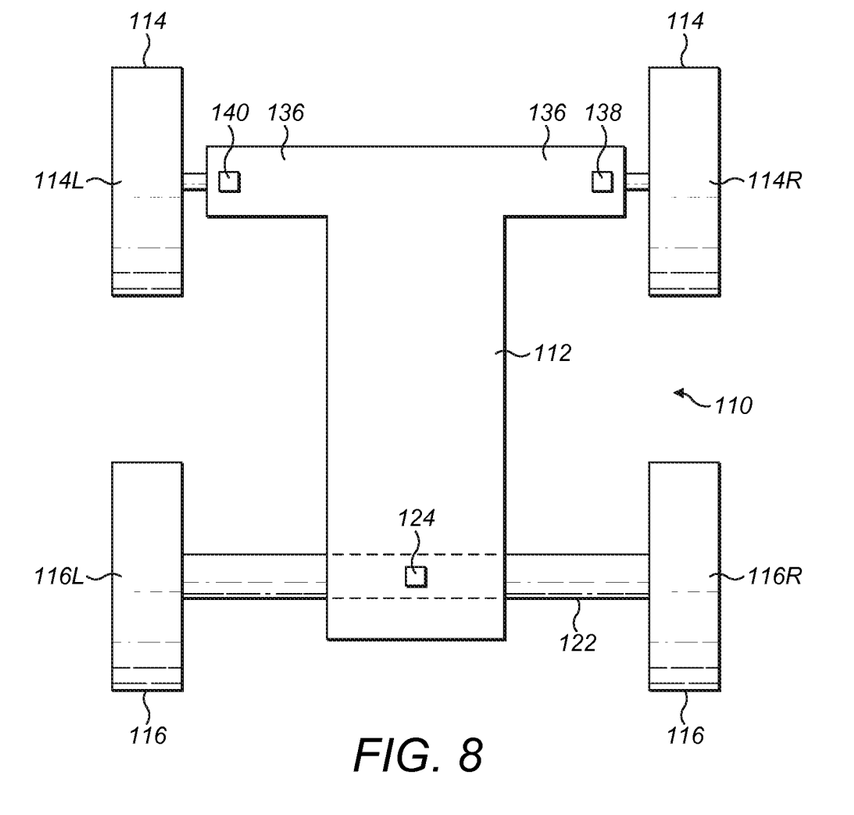
FIG. 8 is a plan view of part of the machine of FIG. 7.

With reference to FIGS. 7 and 8 there is shown a further embodiment of a working machine 110 with features that perform the same function as machine 10 labelled 100 greater.

Machine 110 includes rear axle 122 which is pivotally attached to the chassis 112 by a generally substantially horizontal pivot axis which is orientated in the longitudinal direction of the machine 110. Rigidly attached to the chassis 112 is a front axle 136 (best seen in FIG. 7).

Positioned on the front axle 136 near the front right wheel 114R is an axle sensor 138 and positioned on the front axle 136 near the front left wheel 114L is a axle sensor 140. Axle sensor 138 is associated with front wheel 114R and axle sensor 140 is associated with front wheel 114L. Sensor 138 may generate a signal indicative of the weight being supported by wheel 114R and sensor 140 may generate a signal indicative of the weight being supported by wheel 114L.

As best seen in FIG. 7 the machine 110 has a plurality of ground-engaging means, in this case four ground-engaging means namely front wheels 114L and 114R and rear wheels 116L and 116R. Each wheel has an associated sensor. Thus wheel 114R has associated with it sensor 138 and wheel 114L has associated with sensor 140. rear wheel 116R has a associated with it sensor 124. Rear wheel 116L has associated with it sensor 124. As will be appreciated sensor 124 is associated with both wheels 116R and wheels 116L. Because each sensor 138, 140 and 124 is capable of generating a signal representing a force exerted on its associated wheel or wheels, and since all ground-engaging means have a sensor, then the weight of an unladen vehicle can be determined from the signals from all sensors. Similarly, the weight of a laden vehicle can be determined from the signals from all sensors. If the laden and unladen weights of the vehicle can be determined, then it is possible to determine a load carried by the vehicle simply by subtracting the unladen weight of the vehicle from the laden weight of the vehicle. Accordingly, it is not necessary to have an arm sensor equivalent to arm sensor 30 since, under these circumstances the manner in which the load is determined is not dependent upon the extended/retracted position of the arm. Furthermore it is not necessary to have a sensor equivalent to sensor 26 since, when determining the weight of a load under these circumstances it is not necessary to know the angle of the arm relative to the chassis.

However, advantageously, a chassis sensor 128 may improve the accuracy of measuring the load. This is because the axle sensor 138, axle sensor 140 and sensor 124 may only be capable of measuring loads applied perpendicular to a horizontal plane of the chassis. Thus as shown in FIG. 7, the tare weight (Wt) can be derived as follows:

$Wt$ = unladen weight supported on wheel 114$R$ (derived from the signal from sensor 138) + weight supported on wheel 114$R$(derived from the signal from sensor 140) + weight supported by rear axle (derived from the signal from sensor 124).

Figure 9:
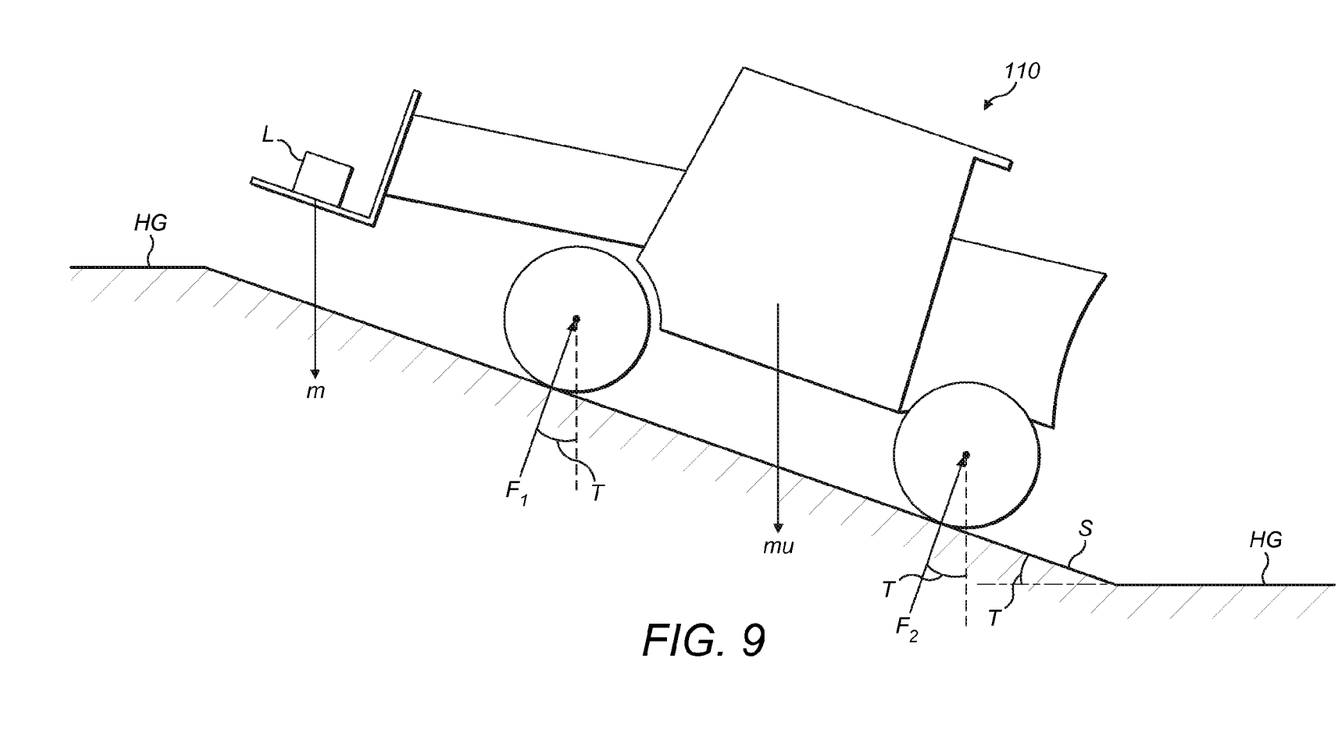
FIG. 9 shows the machine of FIG. 7 on a slope carrying a load.

As shown in FIG. 9, the laden weight (WL) can be derived as follows:

$WL =$ (unladen weight supported on wheel 114

$R$(derived from the signal from sensor 138) + weight supported on wheel 114$R$(derived from the signal from sensor 140)

The weight of the load is therefore (WL−Wt).

Figure 10:
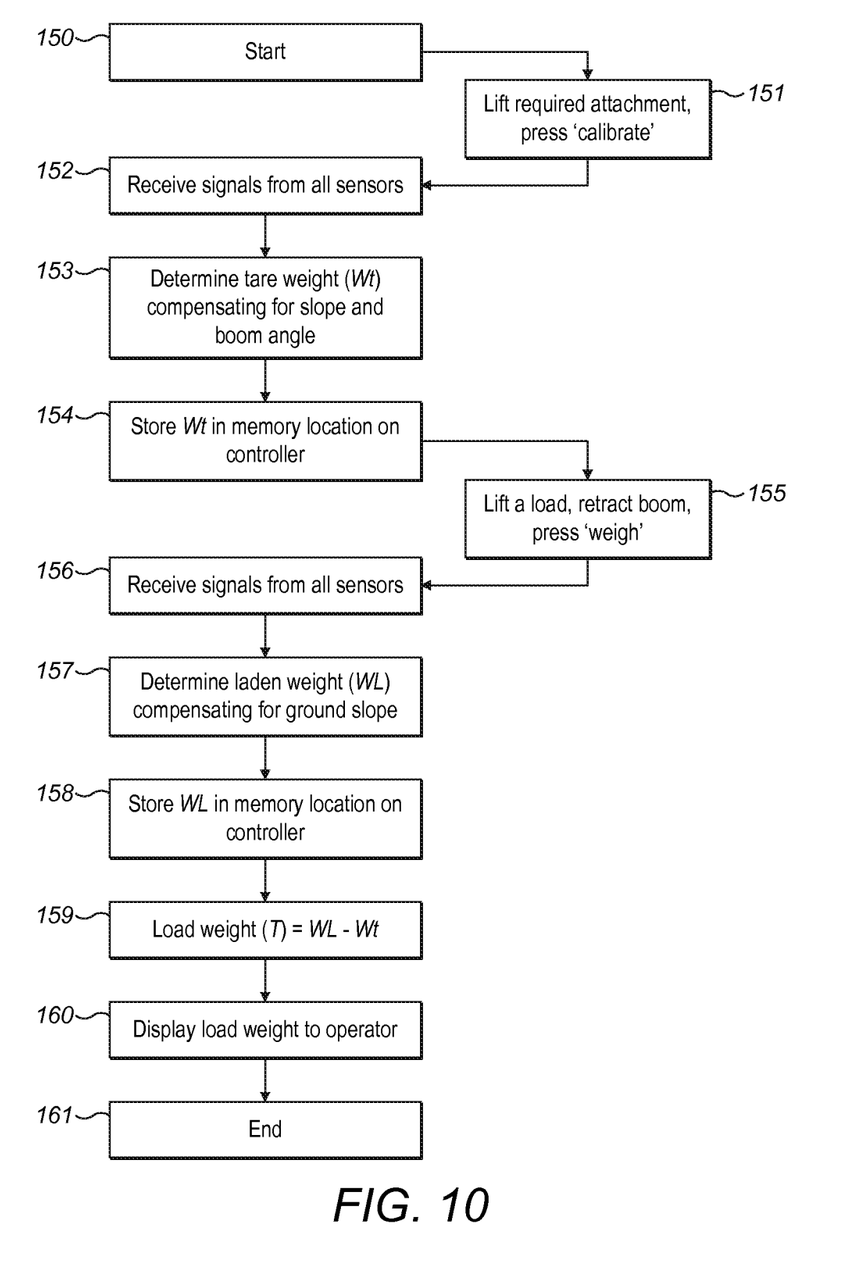
FIG. 10 shows steps required to measure a load according to the present invention.

FIG. 10 shows a method of weighing loads lifted by arm 118 of the machine 110. Steps in FIG. 10 equivalent to steps shown in FIG. 6 are labelled 100 greater. Note that at step 157 compensation is only required for the slope of the ground. This can be contrasted with step 56 shown in FIG. 6 where compensation is required for slope of the ground, boom angle and boom extension.

Working machine 10 and 110 are both telehandlers. However the invention is equally applicable to any type of machine capable of lifting a load, for example, a loading shovel, a back hoe loader and the like. On the machines 10 and 110 load is applied to the attachment which is at the front of the machine. The invention is equally applicable to machines whenever a load is picked up at the back of the machine, for example where the load is picked up by a back hoe. The boom 18 is an extendable boom although the invention is equally applicable to non-extendable booms, arms and the like. The working machine 10, 110 has attachment 20/120, although any other type of suitable attachment may be used.

The axle sensor 24 may be a known type of axle sensor, for example a strain gauge applied to the axle. However other known types of axle sensors are equally applicable to the invention. Similarly any type of angle sensor may be used with the invention. Similarly any type of sensor which can be used to determined the slope of the ground upon which the machine is standing could be used in place of sensor 28. The arm extension sensor could be a sensor which determines how far the arm has been extended. However in other embodiments the arm extension sensor could simply be a sensor which determines when the arm is fully retracted. When such a sensor is used with the machine 10, then it will only be possible to weigh the load by ensuring that at step 51 of FIG. 6 and at step 55 the boom is in the same position, e.g. in the fully retracted position. As shown at step 60 of FIG. 6 and step 160 of FIG. 10 the weight of the load is displayed on display unit 34/134. Whilst it is preferable to display the weight of the load to the operator, this step is not a requirement of the invention. For example the weight of the load could be stored in the ECU for later downloading or the like. Under such circumstances the operator may not know the weight of the load but nevertheless the load has been weighed.

As described above the front axle of machine 110 is rigidly attached to chassis 112. In further embodiments the front axle may be pivotally attached to the chassis by a generally substantially horizontal pivot axis which is orientated in the longitudinal direction of the machine. Under such circumstances a hydraulic ram is selectively operable to pivot the front axle relative to the chassis. The hydraulic ram is operable such that the front axle is selectively non-movably fixed relative to the chassis of the machine. Such an arrangement is useful when the machine is required to lift a load when positioned on a lateral slope, for example when the front and rear right hand wheels are positioned higher than the front and rear left hand wheels. Under such circumstances the hydraulic ram can be operated to tilt the chassis to the right relative to the front and rear axles so that the cab is orientated vertically and the pivot axis of the arm is orientated horizontally. Once the cab and pivot axis are in their appropriate position hydraulic ram "locks" the front axle relative to the chassis.

As shown in FIG. 1, the horizontal pivot axis A is positioned above the axis C. However, in the further embodiments this need not be the case. In particular the horizontal pivot axis A may typically be positioned behind axis C (i.e. to the right when viewing FIG. 1) of a vertical line drawn through axis C.

The invention claimed is:

1. A method of weighing a load lifted by a lifting arm of a machine, the method comprising:
    providing an axle sensor at an axle of the machine configured to sense a force exerted on an axle as a result of lifting the load;
    providing a further sensor configured to sense an angle or slope of the lifting arm relative to a chassis of the machine;
    providing a chassis sensor configured to sense an angle of a chassis relative to horizontal;
    receiving in a processor an axle sensor signal from the axle sensor, said axle sensor signal representing the sensed force exerted on the axle as a result of lifting the load;
    receiving in the processor a further signal from the further sensor, said further signal representing the angle or slope of the lifting arm relative to the chassis of the machine;
    receiving in the processor a chassis signal from the chassis sensor, said chassis signal representing the angle of the chassis relative to the horizontal; and
    calculating in the processor, from the received axle sensor signal, the received further signal, and the received chassis signal, the weight of the load lifted by the lifting arm.

2. A method as defined in claim 1, wherein the lifting arm is an extendable lifting arm, the method further comprising receiving an arm signal from an arm sensor, the arm signal representing an extension of the lifting arm; and
    calculating in the processor, from the arm signal, the weight of the load lifted by the machine.

3. A method as defined in claim 2, wherein the arm signal represents a zero extension of the lifting arm.

4. A method as defined in claim 1, including receiving a datum signal from the axle sensor and/or the further sensor whilst the machine is in a first orientation and prior to lifting the load; and
    subsequently lifting the load, wherein the step of receiving said signal from said axle sensor and receiving said further signal from said further sensor are both carried out with the machine in a second orientation different from the first orientation and calculating, from the received signal, the received further signal and the datum signal the weight of the load lifted by the lifting arm.

5. A method as defined in claim 4 wherein with the machine in the first orientation the arm is at a first angle relative to the chassis and with the machine in the second orientation the arm is at a second angle relative to the chassis.

6. A method as defined in claim 4 wherein with the machine in the first orientation the chassis is at a first angle relative to the horizontal and with the machine in the second orientation the chassis is at a second angle relative to the horizontal.

7. A method as defined in claim 4 wherein with the machine in the first orientation the arm is at a first extension and with the machine in a second orientation the arm is at a second extension.

8. A method of weighing a load lifted by a lifting arm of a machine, the machine having a plurality of wheels each engaged with the ground, the method comprising:
   equipping the plurality of wheels with corresponding first sensors, each first sensor configured to measure a force exerted on the wheels associated with the first sensor;
   equipping the machine with a chassis sensor configured to sense an angle of a chassis relative to the horizontal;
   receiving in a processor a signal from each first sensor, each signal of each first sensor representing the force exerted on the wheels associated with the first sensor as a result of lifting the load;
   receiving in the processor a chassis signal from the chassis sensor, said chassis signal representing the angle of the chassis relative to the horizontal; and
   calculating in the processor, from the received chassis signal and from the first sensors, the weight of the load lifted by the lifting arm.

9. A method as defined in claim 8, wherein the plurality of wheels includes first and second front wheels and first and second rear wheels, the machine further including a one of the first sensors associated with the first and second rear wheels.

10. A method as defined in claim 9, wherein the first and second rear wheels are mounted on a rear axle, said rear axle being pivotally mounted to a chassis of the machine said one of the first sensors being mounted on said rear axle.

11. A method as defined in claim 9, wherein the first and second front wheels are mounted on a front axle, said front axle being non-movably fixed relative to a chassis of the machine; and
   a second one of the first sensors being mounted on the front axle proximate the first front wheel and a third one of the first sensors being mounted on the front axle proximate the second front wheel.

12. A method as defined in claim 9, wherein the first and second front wheels are mounted on a front axle, said front axle being selectively non-movably fixed relative to a chassis of the machine; and
   a second one of the first sensors being mounted on the front axle proximate the first front wheel and a third one of the first sensors being mounted on the front axle proximate the second front wheel.

* * * * *